United States Patent
Lee et al.

(10) Patent No.: US 9,148,647 B2
(45) Date of Patent: Sep. 29, 2015

(54) ELECTRONIC DEVICES AND METHODS FOR PROCESSING VIDEO STREAMS

(71) Applicant: MEDIATEK INC., Hsin-Chu (TW)

(72) Inventors: Yueh-Lun Lee, Taichung (TW); Chia-Wei Pan, Hsinchu (TW); Kan-Li Huang, Taipei (TW); Te-Chi Hsiao, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 439 days.

(21) Appl. No.: 13/760,076

(22) Filed: Feb. 6, 2013

(65) Prior Publication Data
US 2014/0218471 A1   Aug. 7, 2014

(51) Int. Cl.
*H04N 13/00* (2006.01)
*H04N 21/434* (2011.01)
*H04N 21/44* (2011.01)
*H04N 19/597* (2014.01)

(52) U.S. Cl.
CPC ......... *H04N 13/0048* (2013.01); *H04N 19/597* (2013.01); *H04N 21/4341* (2013.01); *H04N 21/4347* (2013.01); *H04N 21/44004* (2013.01)

(58) Field of Classification Search
CPC ............. H04N 13/00; H04N 13/0048; H04N 21/4341; H04N 21/4347; H04N 21/44004; H04N 19/597; H04N 21/23106; H04N 21/23605; H04N 21/2365
USPC .................. 348/42–43, 423.1, 384, 714, 716, 348/563–564
See application file for complete search history.

(56) References Cited

U.S. PATENT DOCUMENTS

| | | | | |
|---|---|---|---|---|
| 5,521,922 A * | 5/1996 | Fujinami et al. | ............... | 370/543 |
| 5,898,695 A * | 4/1999 | Fujii et al. | ..................... | 370/464 |
| 6,151,441 A * | 11/2000 | Kawamura et al. | ........... | 386/240 |
| 6,654,500 B1 | 11/2003 | Lyu | | |
| 7,751,436 B2 * | 7/2010 | Read | ............................. | 370/468 |
| 8,311,094 B2 * | 11/2012 | Kamariotis et al. | ..... | 375/240.02 |

(Continued)

FOREIGN PATENT DOCUMENTS

| EP | 0 713 341 A2 | 5/1996 |
|---|---|---|
| EP | 0 713 341 A3 | 3/1999 |

OTHER PUBLICATIONS

Damir Isović et al., "Timing constraints of MPEG-2 decoding for high quality video: misconceptions and realistic assumptions", Proceedings of the 15th Euromicro Conference on Real-Time Systems, 2003, XP010644819, IEEE.

*Primary Examiner* — Trang U Tran
(74) *Attorney, Agent, or Firm* — Winston Hsu; Scott Margo

(57) ABSTRACT

An embodiment of the invention provides a method performed by a de-multiplexer that is coupled to a front-end stream buffer and a plurality of back-end video buffers. The front-end stream buffer is configured to buffer a plurality of video data units of a video stream. The video stream includes a plurality of subordinate video streams interleaved therein. Each of the back-end video buffers is configured to buffer the video information contained in a corresponding one of the subordinate video streams. First, the de-multiplexer determines whether it is blocked from fetching the video information of a first video data unit buffered in the front-end stream buffer. Then, if being blocked, the de-multiplexer skips accessing the first video data unit and instead fetches the video information of a second video data unit buffered in the front-end stream buffer.

13 Claims, 4 Drawing Sheets

(56) References Cited

U.S. PATENT DOCUMENTS 8,320,686 B2 * 11/2012 Kondou .................. 382/232
2004/0066846 A1 4/2004 Yun et al.
2012/0069144 A1 * 3/2012 Li et al. .................. 348/43
2012/0075421 A1 3/2012 Tsukagoshi

* cited by examiner

ELECTRONIC DEVICES AND METHODS FOR PROCESSING VIDEO STREAMS

BACKGROUND

1. Technical Field

The invention relates generally to video streams, and more particularly, to electronic devices and methods for processing video streams.

2. Related Art

Video standards such as the Multiview Video Coding (MVC) standard, which is ancillary to the H.264 standard, allow a single video stream to contain video information of different views. For example, these standards allow a first elementary stream (e.g. a right-view video stream) and a second elementary stream (e.g. a left-view video stream) to be combined together to form a single multi-view video stream. Such a multi-view video stream can also be referred to as a stereo video stream.

For an electronic device to process a multi-view video stream the electronic device may firstly separate and store the first elementary stream and the second elementary stream into a buffer for further processing thereafter. Since the first elementary stream and the second elementary stream may be haphazardly mixed in the multi-view video stream, the electronic device may have to reserve a large buffer space for consecutively buffering the first elementary stream and the second elementary stream in terms of smoothly displaying the multi-view video stream.

If the buffer space is insufficient, the electronic device may be stuck in a deadlock. When there is a deadlock, the electronic device may have no choice but to sacrifice its user's video-watching experience by discarding some of the buffered elementary streams prematurely, i.e. before these images are processed or displayed.

SUMMARY

One of the objectives of the invention is to provide embodiments of electronic devices and methods that may prevent deadlocks from occurring.

An embodiment of the invention provides an electronic device. The electronic device includes a front-end stream buffer, a de-multiplexer, and a plurality of back-end video buffers. The front-end stream buffer buffers a plurality of video data units of a video stream. The video stream includes a plurality of subordinate video streams interleaved therein. Each of back-end video buffers is configured to buffer video information included in one of the subordinate video streams. The de-multiplexer is coupled to the front-end stream buffer and the back-end video buffers and is configured to: fetch video information of the video data units buffered in the front-end stream buffer and pass the fetched video information to the back-end video buffers; and skip accessing a first video data unit buffered in the front-end stream buffer and instead fetch video information of a second video data unit buffered in the front-end stream buffer.

An embodiment of the invention provides a method performed by a de-multiplexer that is coupled to a front-end stream buffer and a plurality of back-end video buffers. The front-end stream buffer is configured to buffer a plurality of video data units of a video stream. The video stream includes a plurality of subordinate video streams interleaved therein. Each of the back-end video buffers is configured to buffer video information contained in one of the subordinate video streams. First, the de-multiplexer determines whether it is blocked from fetching video information of a first video data unit buffered in the front-end stream buffer. Then, if being blocked, the de-multiplexer skips accessing the first video data unit and instead fetches video information of a second video data unit buffered in the front-end stream buffer.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

Figure 1:
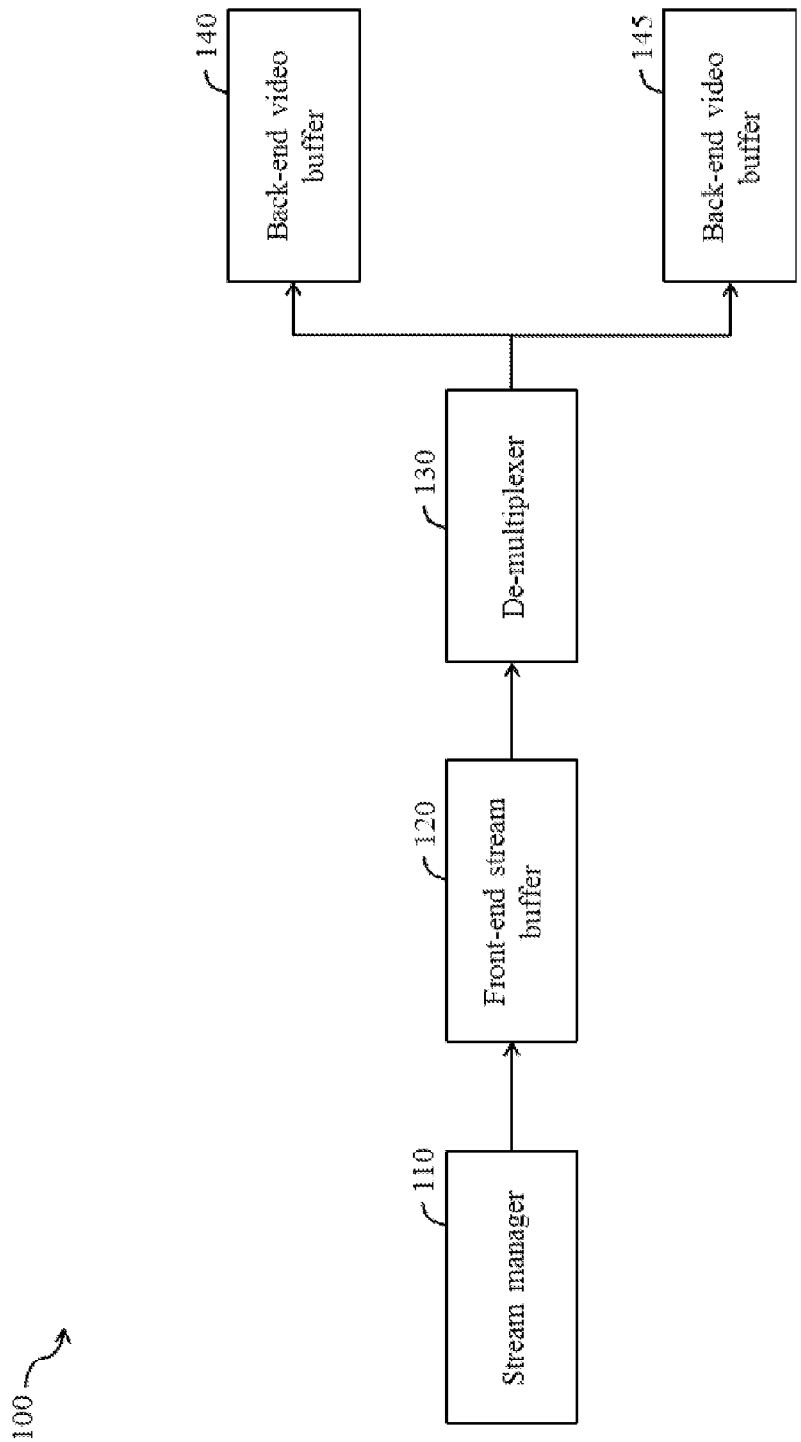
FIGS. 1, 3, and 4 show block diagrams of a part of electronic devices according to three embodiments of the invention.
Figure 3:
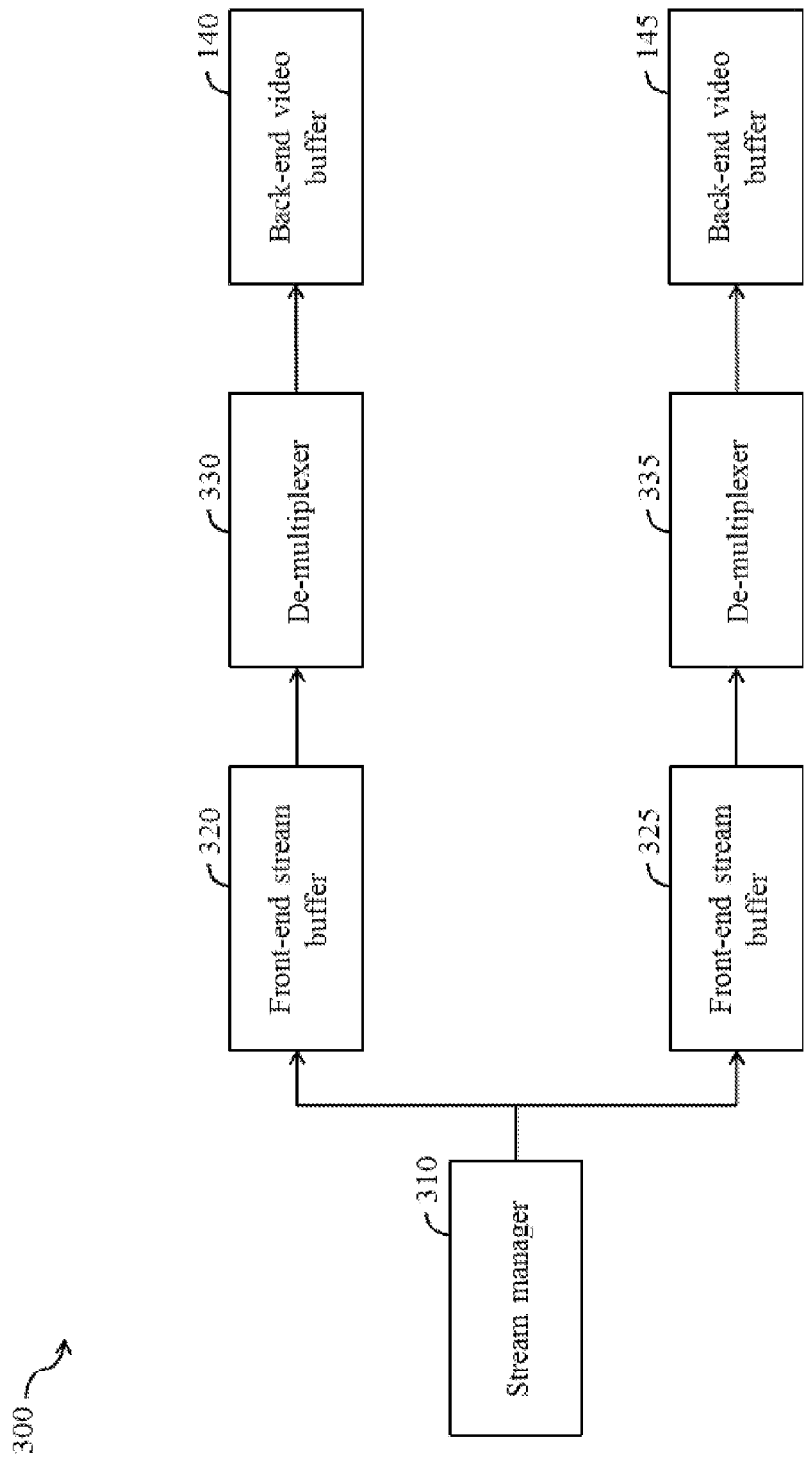
Figure 4:
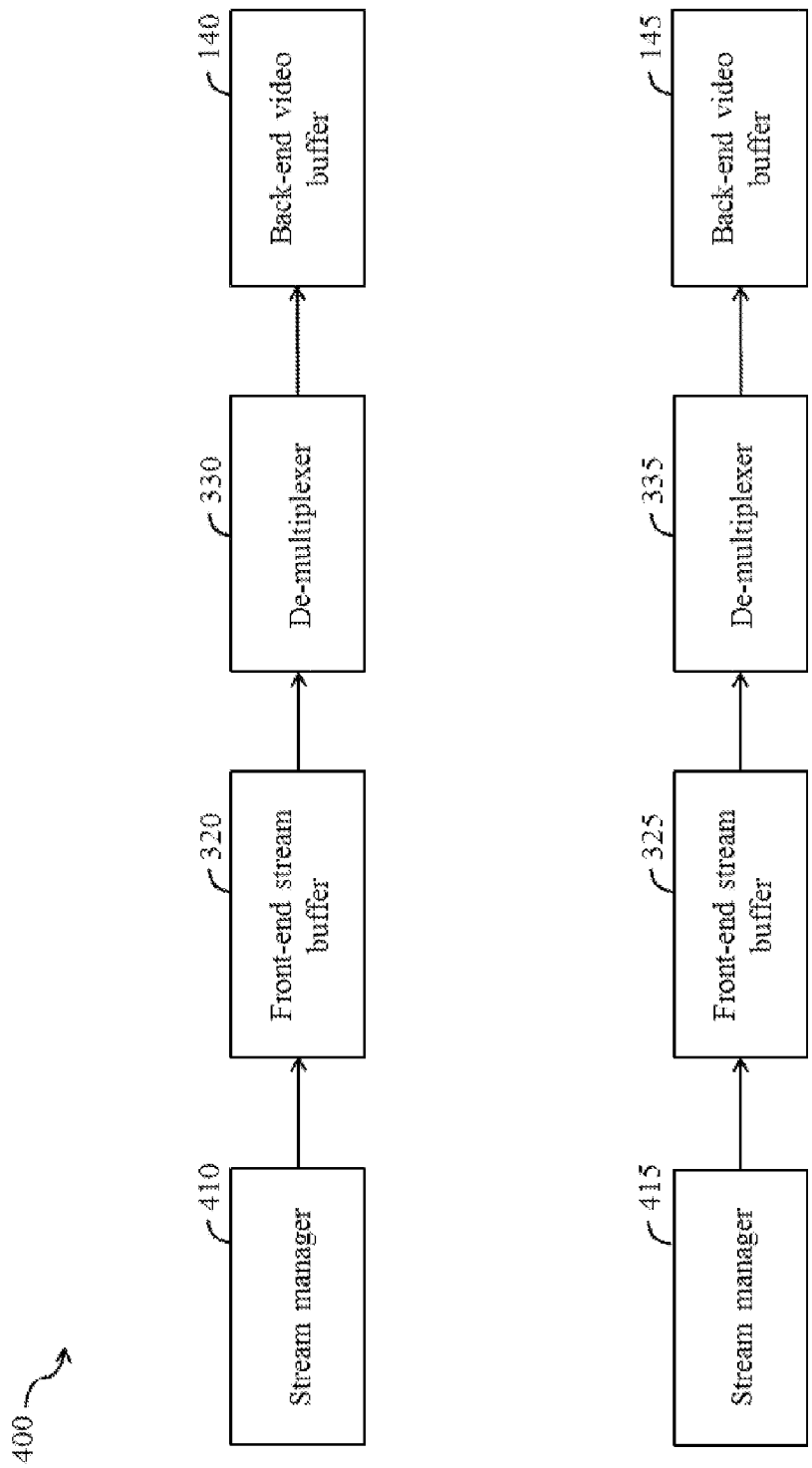

FIGS. 1, 3, and 4 show block diagrams of a part of electronic devices according to various embodiments of the invention. Any of the electronic devices 100, 300, and 400 of these embodiments can process, e.g. decompress and then display, a video stream. To name a few examples, the electronic device 100/300/400 can be a television, a set-top box, an optical disc player, a media player, a desktop computer, a laptop computer, a tablet computer, a smart phone, or a video game console.

The video stream may comprise a plurality of subordinate video streams, e.g. elementary streams, therein. Specifically, the subordinate video streams and other non-visual information can be interleaved together to form the video stream. The subordinate video streams can correspond to a plurality of individual videos of a plurality of different channels (or virtual channels), or correspond to a plurality of views of a multiview video. For example, the video stream can be a stereoscopic interleaved file (ssif) stream having a main view elementary stream and a sub-view elementary stream. The main view elementary stream may be independent from the sub-view elementary stream and can be displayed without referring to the sub-view elementary stream; the sub-view may be dependent to the main view elementary stream and can be decoded by referring to the main view elementary stream. In such an example, one of the subordinate video streams can correspond to the main view elementary stream while the other of the subordinate video streams can correspond to the sub-view elementary stream. When being displayed properly, such a video stream can give a viewer an impression that he or she is watching a three dimensional video, in which different parts of a scene can have different visual depths. Although there can be more than two subordinate video streams, the following explanation will mention only a first subordinate video stream and a second subordinate video stream of the video stream for the sake of brevity.

The electronic device 100/300/400 may fetch the video stream from a storage medium (such as a hard disk, an optical disc, or a flash memory) or receive the video stream from a network (such as a telecommunications network, an intranet, or the Internet). Rather than processing the video stream entirely at once, the electronic device 100/300/400 processes the video stream piece by piece. For example, the video stream may comprise a plurality of successive data units. Each of the data units can be a packet that has a payload section for carrying information; different packets may have different sizes.

The electronic device 100/300/400 may retain some data units of the video stream for processing, and discard a retained packet for releasing space of the buffer once it's no longer needed. The electronic device 100/300/400 can then use the released or free space to store other newly received data units of the video stream.

Please refer to FIG. 1. The electronic device 100 of this embodiment includes a stream manager 110, a front-end stream buffer 120, a de-multiplexer 130, a first back-end video buffer 140, and a second back-end video buffer 145. Other components of the electronic device 100 are omitted from FIG. 1 for the sake of simplicity.

The stream manager 110 receives the video stream from a storage medium or a network. Then the stream manager 110 passes the video stream to the front-end stream buffer 120 piece by piece, e.g. one packet after another. Each of the piece/packet may also be referred to as a data unit. The front-end stream buffer 120 stores a packet it receives from the stream manager 110 until the packet or the information contained therein has been fetched, e.g. by the de-multiplexer 130. The front-end stream buffer 120 can then use the free space to buffer another packet of the video stream newly received from the stream manager 110.

The de-multiplexer 130 fetches video information of video packets buffered in the front-end stream buffer 120 and passes the fetched video information to the back-end video buffers 140 and 145. Specifically, from the front-end stream buffer 120, the de-multiplexer 130 fetches video information of video packets belonging to the first subordinate video stream successively and passes the fetched video information to the first back-end video buffer 140. Also the de-multiplexer 130 fetches video information of video packets belonging to the second subordinate video stream successively and passes the fetched video information to the second back-end video buffer 145. In doing so, the de-multiplexer 130 determines whether the packet belongs to the first or second subordinate video stream by using a packet identifier ("packet ID") or other information associated with each packet buffered in the front-end stream buffer 120. When the de-multiplexer 130 fetches video information of a video packet buffered in the front-end stream buffer 120, the video packet may be, but needs not always be, the oldest video packet buffered in the front-end stream buffer 120. In other words, among all the video packets buffered in the front-end stream buffer 120, the fetched video packet may be, but needs not always be, the one that enters the front-end stream buffer 120 the earliest.

The de-multiplexer 130 can constitute a single functional block, or comprises multiple subordinate functional blocks, each for fetching one of the subordinate video streams. For example, one of the subordinate functional blocks can be a first subordinate de-multiplexer while the other can be a second subordinate de-multiplexer. The first subordinate de-multiplexer fetches, from the front-end stream buffer 120, video information of video packets belonging to the first subordinate video stream successively and passes the fetched video information to the first back-end video buffer 140. The second subordinate de-multiplexer fetches, from the front-end stream buffer 120, video information of video packets belonging to the second subordinate video stream successively and passes the fetched video information to the second back-end video buffer.

The first back-end video buffer 140 buffers a plurality of data units of the first subordinate video stream it receives from the de-multiplexer 130. The second back-end video buffer 145 buffers a plurality of data units of the second subordinate video stream it receives from the de-multiplexer 130. A processor, which is not depicted in FIG. 1, of the electronic device 100 can process, e.g. decompress and then display, the video information buffered in the two buffers 140 and 145. Once a first data unit of the first subordinate video stream has been processed and no longer needed, the processor controls the first back-end video buffer 140 to discard the first data unit of the first subordinate video stream so as to release or free (make it available for use) the buffer space for buffering another data unit of the first subordinate video stream. Similarly, once a second data unit of the second subordinate video stream has been processed and no longer needed, the processor controls the second back-end video buffer 145 to discard the second data unit of the first subordinate video stream so as to release or free (make it available for use) the buffer space for buffering another data unit of the second subordinate video stream. As an example, the first back-end video buffer 140 and the second back-end video buffer 145 are first-in-first-out (FIFO) memories.

Figure 2:
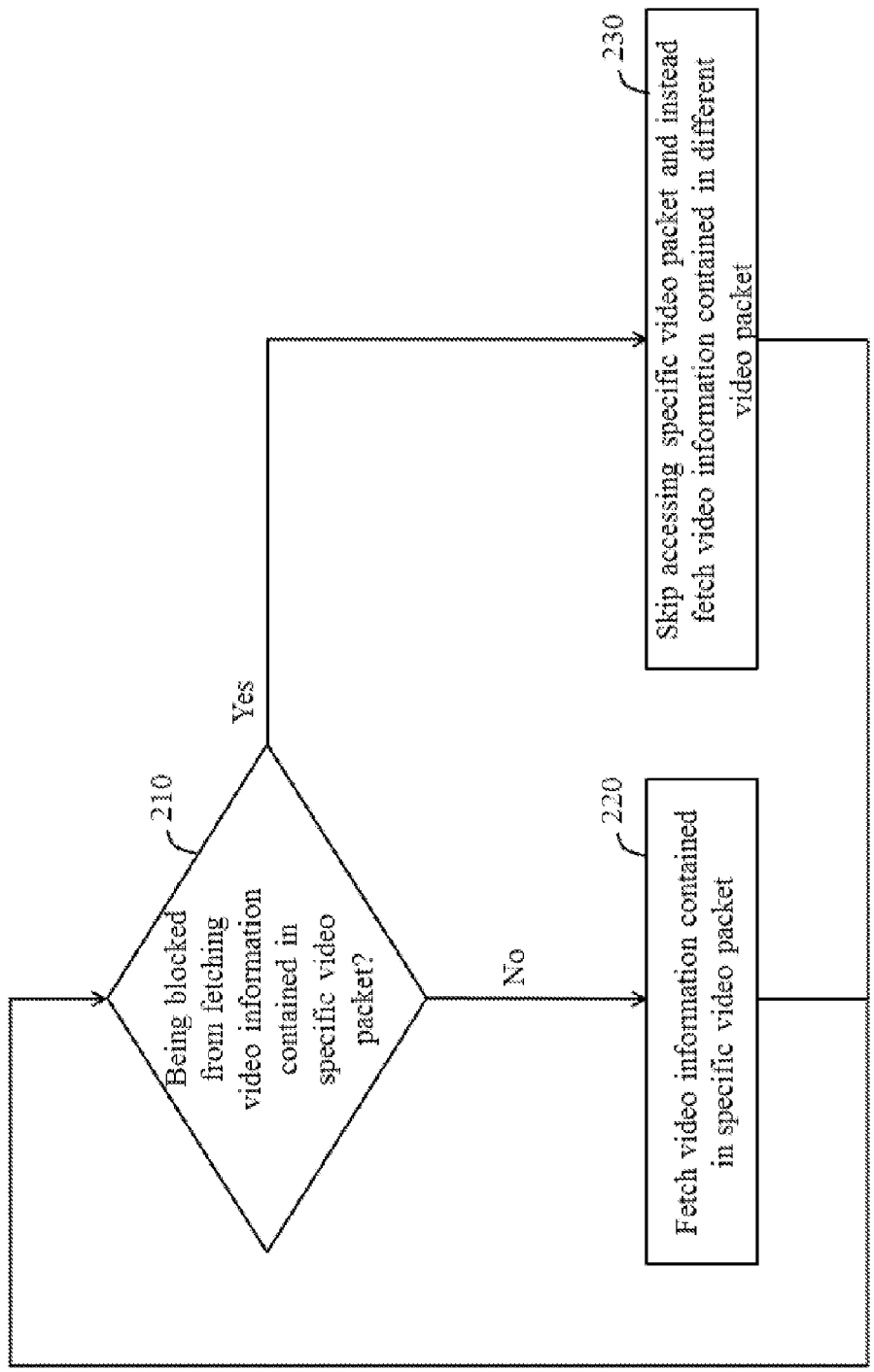
FIG. 2 shows a flowchart of an exemplary method performed by the de-multiplexer shown in FIG. 1.

FIG. 2 shows a flowchart of an exemplary method performed by the de-multiplexer 130 of FIG. 1. Using this method, the de-multiplexer 130 may prevent deadlock from occurring while not requiring the size of either the first back-end video buffer 140 or the second back-end video buffer 145 or both to be extended.

First, at step 210, the de-multiplexer 130 determines whether it is blocked from fetching video information buffered in the front-end stream buffer 120. If the answer is no, it enters step 220; otherwise, it enters step 230.

In performing step 210, the de-multiplexer 130 can firstly determine whether a specific video packet, e.g. an oldest video packet, belongs to the first or second subordinate video stream by checking the packet ID or other information associated with this packet. Among all the video packets currently buffered in the front-end stream buffer 120, an oldest video packet is the one that enters the front-end stream buffer 120 the earliest. If the specific video packet belongs to the first subordinate video stream, the de-multiplexer 130 checks whether the first back-end video buffer 140 has sufficient space for buffering the video information of this specific video packet. If the answer is yes, the de-multiplexer 130 determines that it is not blocked from fetching the specific video packet and as a result enters step 220; otherwise, the de-multiplexer 130 determines that it is blocked from fetching the specific video packet and as a result enters step 230. Similarly, if the specific video packet belongs to the second subordinate video stream, the de-multiplexer 130 checks whether the second back-end video buffer 145 has sufficient space for buffering the video information of the specific video packet. If the answer is yes, the de-multiplexer 130 determines that it is not blocked and as a result enters step 220; otherwise, the de-multiplexer 130 determines that it is blocked from fetching the specific video packet and as a result enters step 230. The de-multiplexer 130 can perform step 210 after the first back-end video buffer 140 or the second back-end video buffer 145 has already discarded some of the no-longer-needed video information buffered therein and therefore making some space to be available for further buffering.

At step 220, the de-multiplexer 130 fetches the video information of the specific video packet buffered in the front-end stream buffer 120 and passes the fetched information to the first back-end video buffer 140 or the second back-end video buffer 145, whichever is suitable for buffering the video information. Specifically, if this specific video packet belongs to the first subordinate video stream, the de-multiplexer 130 passes the video information contained therein to the first back-end video buffer 140; if this specific video packet belongs to the second subordinate video stream, the de-multiplexer 130 passes the video information contained therein to the second back-end video buffer 145. This specific video packet is then discarded from the front-end stream buffer 120. After step 220, the de-multiplexer 130 can then go back to step 210 to deal with a subsequent video packet.

In conventional, if one of a first back-end video buffer and a second back-end buffer is full, the de-multiplexer may enter into a deadlock. For example, the de-multiplexer keeps waiting for processing a video packet, e.g. an oldest video packet, stored in the front-end buffer, but it has been stocked due to no enough space in the full occupied back-end buffer. Conventionally, to resolve the deadlock, the processor may have no choice but either to extent the back-end buffer size or to discard some video information retained in the first back-end video buffer or the second back-end video buffer in order to release some space for the video information of the oldest video packet buffered in the front-end stream buffer.

However, in one embodiment of the invention, if the de-multiplexer 130 enters step 230, it means that at least one of the first back-end video buffer 140 and the second back-end video buffer 145 may be full or have no enough space to buffer some more video information. Step 230 of the invention may allow the electronic device 100 to resolve the potential deadlock without discarding some video information retained in the first back-end video buffer 140 or the second back-end video buffer 145 prematurely.

If the de-multiplexer 130 was a conventionally one, it would fetches video packets buffered in the front-end stream buffer 120 sequentially. In other words, before fetching the oldest video packet, it would not fetch any other video packet from the front-end stream buffer 120. However, the de-multiplexer 130 of this embodiment is different from the conventional one. At step 230, instead of insisting on fetching the video information of a specific video packet when being blocked from doing so, the de-multiplexer 130 fetches video information of a different video packet (i.e. a newly accessed video packet). For example, this newly accessed video packet and the skipped specific video packet may belong to different views and the newly accessed video packet may be the oldest among its kind buffered in the front-end stream buffer 120. Specifically, if the specific video packet is on the first view, the newly accessed video packet fetched at this step can be on the second view and may be the oldest second view video packet buffered in the front-end stream buffer 120. If the specific video packet is on the second view, the newly accessed video packet fetched at step 230 can be on the first view and may be the oldest first view video packet buffered in the front-end stream buffer 120. Afterwards, this newly accessed video packet may be discarded from the front-end stream buffer 120.

After step 230, the de-multiplexer 130 can then go back to step 210 to fetch video information in other video packet or to see whether it can now deal with the skipped specific video packet that is still buffered in the front-end stream buffer 120. This time, the de-multiplexer 130 may no longer be blocked from fetching the video information of the skipped specific video packet. For example, the video information of the newly accessed video packet fetched at step 230 may be referenced by video information retained in the first back-end video buffer 140 or the second back-end video buffer 145, whichever has no sufficient space remaining. The video information fetched at step 230 may allow the retained referencing video information to be processed (e.g. decoded) and then discarded. As a result, the first back-end video buffer 140 or the second back-end video buffer 145, whichever originally had no sufficient space remaining, may now have sufficient space for buffering the video information of the skipped specific video packet. Therefore, step 230 may allow the electronic device 100 to resolve the potential deadlock without requiring the first back-end video buffer 140 or the second back-end video buffer 145 to discard video information prematurely. In addition, the electronic device 100 achieves this result without sacrificing a viewer's video-watching experience. Moreover, the potential deadlock may be resolved in a cost-efficient manner because the capacity of neither the first back-end video buffer 140 nor the second back-end video buffer 145 needs to be extended.

Please refer to FIG. 3. The electronic device 300 of this embodiment includes a stream manager 310, a first front-end stream buffer 320, a second front-end stream buffer 325, a first de-multiplexer 330, a second de-multiplexer 335, a first back-end video buffer 140, and a second back-end video buffer 145. Other components of the electronic device 300 are omitted from FIG. 3 for the sake of simplicity.

The stream manager 310 passes the video stream to both the first front-end stream buffer 320 and the second front-end stream buffer 325 piece by piece, e.g. one packet after another. Specifically, whenever there is a new packet, the stream manager 310 passes the packet to not only the first front-end stream buffer 320 but also the second front-end stream buffer 325. The packet can belong to either the first subordinate video stream or the second subordinate video stream, or comprises non-visual information.

The front-end stream buffer 320/325 retains a packet it receives from the stream manager 310 until the packet or the information contained therein has been fetched, e.g. by the de-multiplexer 330/335 or after it's determined that the packet can be discarded. The front-end stream buffer 320/325 can then use the released space to buffer another packet of the video stream newly received from the stream manager 310.

The de-multiplexer 330/335 fetches video information of video packets belonging to the first/second subordinate video stream from the front-end stream buffer 320/325 successively and passes the fetched video information to the back-end video buffers 140/145. Specifically, if a specific packet buffered in the first front-end stream buffer 320 belongs to the first subordinate video stream, the first de-multiplexer 330 fetches the video information contained therein and passes the fetched video information to the first back-end video buffer 140; this specific video packet is then discarded from the first front-end stream buffer 320. Otherwise, if the specific packet buffered in the first front-end stream buffer 320 does not belong to the first subordinate video stream, the first de-multiplexer 330 lets this video packet discarded from the first front-end stream buffer 320. Similarly, if a specific packet buffered in the second front-end stream buffer 325 belongs to the second subordinate video stream, the second de-multiplexer 335 fetches the video information contained therein and passes the fetched video information to the second back-end video buffer 145; this specific video packet is then discarded from the second front-end stream buffer 325. Otherwise, if the specific packet buffered in the second front-end stream buffer 325 does not belong to the second subordinate video stream, the second de-multiplexer 335 lets this specific packet discarded from second front-end stream buffer 325. The de-multiplexer 330/335 can use the packet ID or other information associated with a packet to determine whether the packet belongs to the first or second subordinate video stream.

The functions of the first back-end video buffer 140 and the second back-end video buffer 145 shown in FIG. 3 are similar to the functions of their counterparts in FIG. 1. Therefore, repetitive explanation is omitted herein.

Please refer to FIG. 4. The electronic device 400 of this embodiment is different from the embodiment show in FIG. 3 in that the former includes two stream managers, including a first stream manager 410 and a second stream manager 415. Furthermore, the first stream manager 410 passes the video stream to the first front-end stream buffer 320 packet by packet, and the second stream manager 415 passes the video stream to the second front-end stream buffer 325 packet by packet. Because there are two stream managers, the electronic device 400 may need to access the source file of the video stream twice. For example, if the electronic device 400 fetches the video stream from a storage medium, it may need to read each section of the storage medium twice. If the electronic device 400 receives the video stream from a network, it may need to receive each packet of the video stream from the network twice.

In similar manners, the electronic device 300/400 may prevent deadlocks from occurring. Taking the electronic device 300 as an example, if the first de-multiplexer 330 is blocked from fetching video information of a specific video packet buffered in the first front-end stream buffer 320 because the first back-end video buffer 140 does not have sufficient space remaining and cannot discard any information buffered therein, the second de-multiplexer 335 may still be able to pass video information belonging to the second subordinate video stream to the second back-end video buffer 145 (as long as this buffer has sufficient space remaining) During decoding process, the video information newly passed to the second back-end video buffer 145 may be referenced by other video information buffered in the first back-end video buffer 140, and hence may cause the referencing video information to be processed and then discarded from the first back-end video buffer 140. As a result, the first back-end video buffer 140, which originally had no sufficient space remaining, may now have spared space for the video information of the specific video packet buffered in the first front-end stream buffer 320. Therefore, the blockage is not an actual deadlock but only a brief blockage, and the first back-end video buffer 140 needs not discard video information retained therein prematurely. Similarly, if it is the second de-multiplexer 335 that is blocked from fetching video information of an oldest video packet buffered in the second front-end stream buffer 325, the blockage may be brief and the second back-end video buffer 145 may not be forced to discard video information retained therein prematurely. While having the aforementioned advantages, the electronic device 300/400 does not require the length of either the first back-end video buffer 140 or the second back-end video buffer 145 or both to be extended.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. An electronic device, comprising:
    a front-end stream buffer for buffering a plurality of video data units of a video stream, the video stream comprising a plurality of subordinate video streams interleaved therein;
    a plurality of back-end video buffers, each being configured to buffer video information contained in one of the subordinate video streams; and
    a de-multiplexer, coupled to the front-end stream buffer and the back-end video buffers, configured to:
        fetch the video information of the video data units buffered in the front-end stream buffer and pass the fetched video information to the back-end video buffers; and
        skip accessing a first video data unit buffered in the front-end stream buffer and instead fetch video information of a second video data unit buffered in the front-end stream buffer; wherein, while the first video data unit being skipped, the first video data unit is still buffered in the front-end stream buffer for further processing.

2. The electronic device of claim 1, wherein the de-multiplexer is further configured to:
    determine whether it is blocked from fetching the video information of the first video data unit; and
    skip accessing the first video data unit and instead fetch the video information of the second video data unit when being blocked from fetching the video information of the first video data unit.

3. The electronic device of claim 2, wherein the de-multiplexer is further configured to:
    determine whether it is blocked from fetching the video information of the first video data unit by checking whether a corresponding one of the back-end video buffers has sufficient space remaining for buffering the video information of first video data unit.

4. The electronic device of claim 2, wherein the first video data unit and the second video data unit belong to two different ones of the subordinate video streams.

5. The electronic device of claim 2, wherein the second video data unit is an oldest one of its kind buffered in the front-end stream buffer.

6. The electronic device of claim 1, wherein one of the subordinate video streams corresponds to a main view of the video stream while another of the subordinate video streams corresponds to a sub-view of the video stream.

7. The electronic device of claim 1, wherein the video stream is a stereoscopic interleaved file (ssif) stream.

8. A method performed by a de-multiplexer that is coupled to a front-end stream buffer and a plurality of back-end video buffers, wherein the front-end stream buffer is configured to buffer a plurality of video data units of a video stream, the video stream comprises a plurality of subordinate video streams interleaved therein, and each of the back-end video buffers is configured to buffer video information contained in one of the subordinate video streams, the method comprising:
    determining whether the de-multiplexer is blocked from fetching video information of a first video data unit buffered in the front-end stream buffer; and
    skipping accessing the first video data unit and instead fetch the video information of a second video data unit when the de-multiplexer is being blocked from fetching the video information of the first video data unit;
    wherein, while the first video data unit being skipped, the first video data unit is still buffered in the front-end stream buffer for further processing.

9. The method of claim 8, wherein the step of determining whether the de-multiplexer is blocked from fetching the video information of the first video data unit comprises:
    determining whether the de-multiplexer is blocked from fetching the video information of the first video data unit by checking whether a corresponding one of the back-end video buffers has sufficient space remaining for buffering the video information of the first video data unit.

10. The method of claim 8, wherein the first video data unit and the second video data unit belong to two different ones of the subordinate video streams.

11. The method of claim 8, wherein the second video data unit is an oldest one of its kind buffered in the front-end stream buffer.

12. The method of claim 8, wherein one of the subordinate video streams corresponds to a main view of the video stream while another of the subordinate video streams corresponds to a sub-view of the video stream.

13. The method of claim 8, wherein the video stream is a stereoscopic interleaved file (ssif) stream.

* * * * *